Nov. 7, 1933.  E. P. BRUS ET AL  1,933,703
DEVICE FOR COOLING CONDENSER WATER
Filed Jan. 20, 1933   2 Sheets-Sheet 1
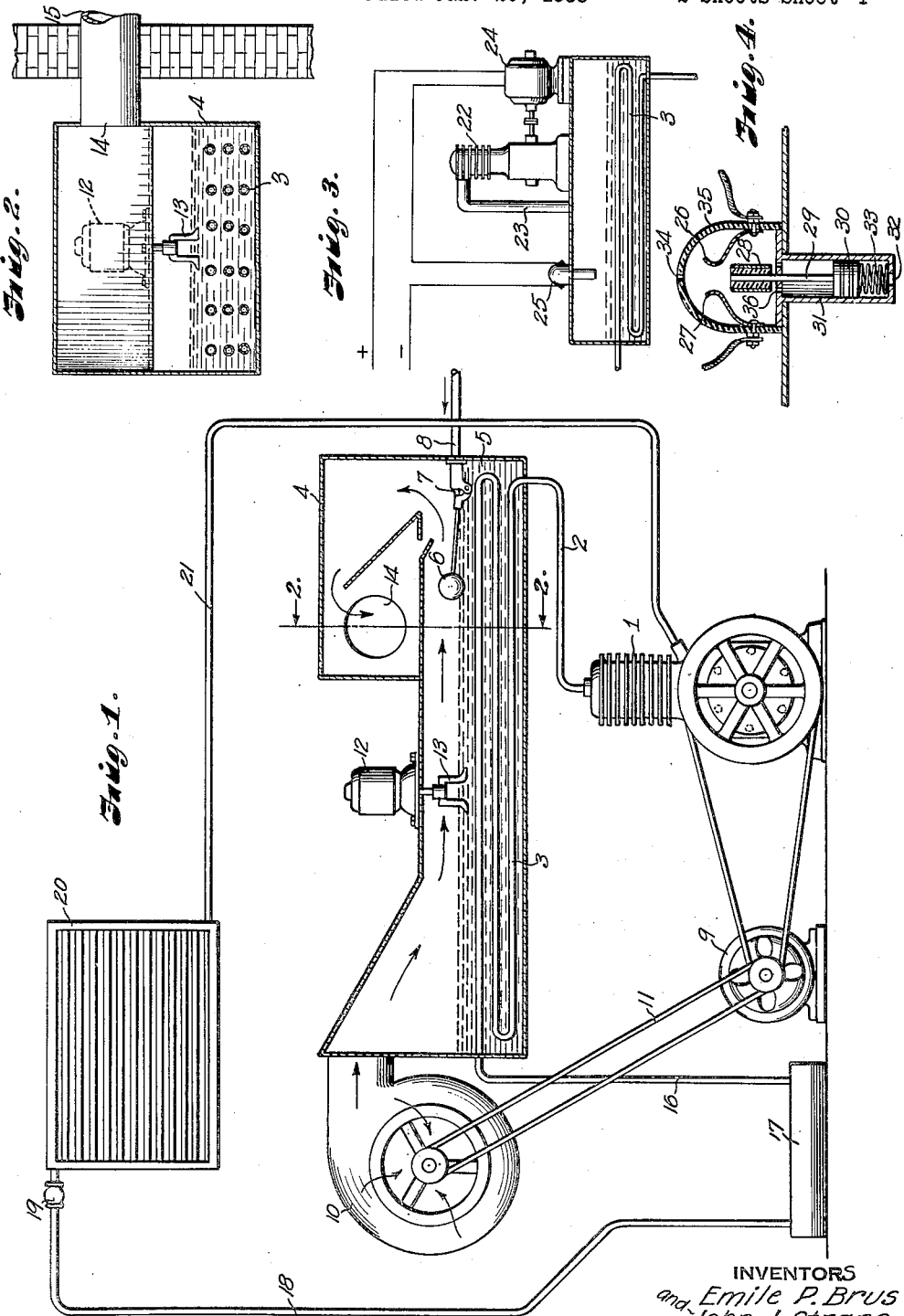
INVENTORS
Emile P. Brus
and John J. Strang
BY Thos. E. Scofield
ATTORNEY

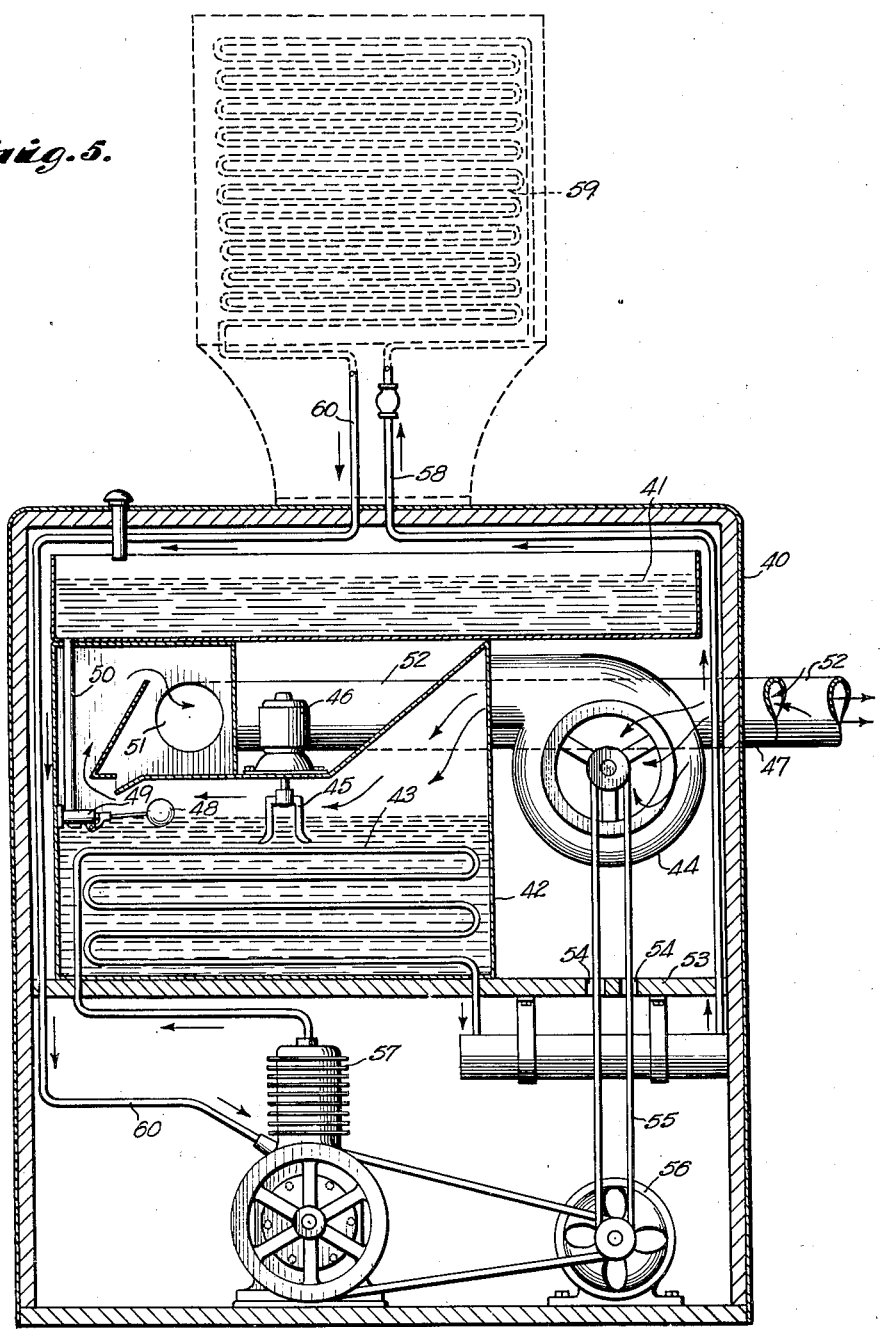

Patented Nov. 7, 1933

1,933,703

UNITED STATES PATENT OFFICE 1,933,703

DEVICE FOR COOLING CONDENSER WATER

Emile P. Brus and John J. Strang, Kansas City, Mo.

Application January 20, 1933. Serial No. 652,671

3 Claims. (Cl. 62—115)

Our invention relates to a device for cooling condenser water in connection with refrigerating apparatus.

Mechanical refrigeration is almost universally used for cold storage plants, ice boxes for use in shops which sell perishable commodities, air conditioning devices and the like. Mechanical refrigeration may be of two types, the compression system and the absorption system. In both it is necessary to remove the heat from the refrigerating device. The heat is usually removed by heat exchange in a condenser. The cooling medium universally used in large plants is water. Some small refrigerating devices cool the condenser by means of air. It has been found that where large quantities of heat must be handled that air is unsatisfactory. The quantity of water circulated in heat exchange with the condenser is usually large and in some cities the expense involved is considerable. Frequently there are localities in which water is scarce and circulating water is used only in connection with a device for cooling the water. These devices are known as water towers and it is known in the art that condenser water may be cooled by evaporation either by blowing air over the surface of the water or by putting the water under a reduced pressure. After the water is cooled, it is pumped around the condenser.

One object of our invention is to provide a device for cooling condenser water in which the necessity of using a circulating pump for the cooling water is eliminated.

Another object of our invention is to provide a portable cooling unit for cooling condenser water which may be attached to a refrigerating plant.

Another object of our invention is to provide a portable unit which may be installed in any convenient place while the refrigerating coil may be put at any desired location.

Other objects of our invention will appear from the following description.

In the accompanying drawings which form part of the instant specification and which are to be read in conjunction therewith and in which like reference numerals are used to indicate like parts;

Figure 1 shows a diagrammatic view of one device embodying our invention.

Figure 2 is a sectional view taken on the line 2—2 of Figure 1.

Figure 3 is a diagrammatic view showing a modification of our invention.

Figure 4 is a detail view showing the control switch for the modification shown in Figure 3.

Figure 5 is a sectional elevation of a unit embodying one mode of carrying out our invention.

In general, our invention contemplates the cooling of a tank of water by evaporation either by blowing air over the tank or by putting the tank under reduced pressure and placing the condenser of a refrigerating system in the tank of water in order to avoid the necessity of pumping the cooling water from place to place. It will be obvious that certain advantages will accrue from this arrangement, among which are the elimination of a pump for handling the cooled water and the loss of heat which would be entailed by piping the cooled water from place to place. By means of our construction, we are enabled to produce a compact unit which may be sold to the trade for attachement to refrigerating plants already installed.

More particularly referring now to the drawings, a compressor 1 compresses the refrigerant gas which is passed through pipe 2 to condenser 3. Condenser 3 is situated in a tank 4 immersed in a body of water 5 which is kept at a predetermined level by means of float 6 which controls valve 7 of the water supply line 8. The compressor 1 is driven by motor 9 which also drives a blower fan 10 by means of a drive belt 11. The blower fan blows air over the surface of the water 5 as indicated by arrows in Figure 1. A small motor 12 operates a paddle arrangement 13 which fills the inside of the tank 4 with drops of water presenting an increased area to the evaporation action of the air. The evaporation of the air will serve to keep the condenser water 5 cool. The air after evaporating the water passes out through opening 14 and is discharged through the pipe 15 out of doors. The cooled refrigerant then passes through pipe 16 through reservoir 17, through pipe 18 through expansion valve 19, through refrigerating unit 20, through pipe 21 to the compressor 1.

Referring now to Figures 3 and 4, the tank 4 contains water as before. In the water we place the condenser coil 3. The tank is air tight and is made of heavy material. A vacuum pump 22 takes suction through line 23 leading to the tank 4. The vacuum pump 22 is driven by a motor 24. A control switch 25 is placed in the motor circuit. This control switch is shown in Figure 4. It consists of a pair of contact points 26 and 27 which are bridged by means of a switch 28. The switch is mounted on a rod 29 which terminates in a piston 30. This piston works in a cylinder 31 which communicates to the interior of the tank 4 through opening 32. A spring 33 normally urges the piston 30 and consequently the switch 28 to circuit closing position. As the motor operates the vacuum pump will reduce the pressure inside of tank 4 until the difference between atmospheric pressure and the pressure within the tank 4 acting through opening 34 in switch housing 35 and through opening 36 and thence on top of the piston 30 against the action of the spring 33 moves the piston 30 downwardly to break the motor circuit. It will be obvious that the spring pressure may be set by any known means. If desired, a series of springs of different strength may be used to govern the pressure which it is desired to maintain within tank 4. The reduced pressure within tank 4 acting upon the surface of the water will evaporate it and thus reduce its temperature to keep the condenser cool.

Referring now to Figure 5, we have shown a portable unit which may be sold to the trade and may be used wherever desired. The unit may consist only of a casing 40 housing a water supply tank 41 and an evaporating water tank 42 containing a condenser coil 43. A blower fan 44 is part of the assembly. This blower fan acts as the blower fan 10 in the device in Figure 1, and is adapted to blow air over the surface of the water in tank 42. This water is agitated by means of an agitator 45 which is driven by a motor 46. Air is supplied to the blower through pipe 47 taken from any suitable source. The water level of the water in tank 42 is kept at a predetermined level by means of float 48 which controls valve 49 which controls the water supply coming through pipe 53 from the water reservoir 41. The moisture laden air passes out through opening 51, through pipe 52, and is discharged out of doors or at any other suitable place depending on the use to which the unit is being put. A partition 53 separates the water tank and blower assembly. It is provided with holes 54 for the passage of a fan belt 55 from a motor 56. If desired, a compressor 57 may be installed in the place within the casing 40 under the partition 53. If the device is to be used with an existing installation, the condenser of the device is placed in tank 42. If desired, the condenser 43 of our assembly may be substituted for the condenser of the device. The salient feature of our assembly is means for cooling the condenser, namely, the tank and the means for evaporating water from the tank and the placing of the condenser within the same tank from which the water is evaporated.

It is to be understood, of course, that the assembly shown in Figure 5 may be such as shown in Figure 3, that is, a vacuum pump may be used to do the evaporating if desired. The cool, compressed refrigerant passes out through line 58 and may be piped to the refrigerating coil 59 which may be located at any desirable point and be put to any desirable use such as an air conditioning device for cooling ice boxes or for making ice. The refrigerant, after doing its cooling work, passes through line 60 to the compressor.

It is believed that the operation of our device will be clear from the above description. It will be appreciated that we have accomplished the objects of our invention and that we are enabled to cool the condenser of a mechanical refrigerator device in an expeditious and convenient manner and by the use of a small number of parts. The placing of the condenser coil within the tank containing water which is cooled by evaporation saves at least one pump and a considerable space. In actual practice we were enabled by means of our invention to save a small retail butcher about $30.00 a month in his water bills occasioned by the saving of the water which he had been using to cool his condenser.

Having thus described our invention, what we claim is:

1. In combination with a mechanical refrigeration system having a condenser, a tank, liquid in said tank, said refrigerating system condenser disposed in said tank surrounded by said liquid, means for passing an air stream over the surface of the liquid to evaporate a portion thereof to cool the same, and means for increasing the surface area of the liquid exposed to the evaporating action of the air.

2. The combination of claim 1 wherein said surface increasing means comprises an agitator.

3. The combination of claim 1 wherein said surface increasing means comprises an impeller having blades, said impeller being disposed above the surface of the liquid with said blades immersed therein, and means for rotating said blades.

EMILE P. BRUS.
JOHN J. STRANG.